United States Patent Office 2,694,073
Patented Nov. 9, 1954

2,694,073

HALOGENATED HETEROCYCLIC INSECT TOXICANT AND PROCESS OF PREPARING SAME

Samuel Barney Soloway, Denver, Colo., assignor, by mesne assignments, to Shell Development Company, Emeryville, Calif., a corporation of Delaware No Drawing. Application February 4, 1954, Serial No. 408,307

3 Claims. (Cl. 260—327)

This invention relates to the production of a novel chemical compound having particular utility as an insecticide, and is a continuation-in-part of copending application Serial No. 63,626, filed December 4, 1948.

More particularly, the present invention relates to the production of the sulfoxy derivative of the Diels-Alder adduct of hexachlorocyclopentadiene and bicyclo(2.2.1)-2,5-heptadiene, and in its substantially pure condition is a white solid melting at about 202° C. with decomposition, of the following structural formula:

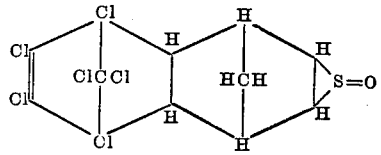

The foregoing novel compound is more directly derived, in accordance with the present invention, by oxidation of the episulfido derivative of the Diels-Alder adduct of hexachlorocyclopentadiene and bicyclo-(2.2.1)-2,5-heptadiene described and claimed in the aforesaid copending application, and unexpectedly the episulfoxy compound exhibits double the toxicity toward insects, such as flies, than does the episulfido compound from which it is directly derived.

The parent episulfido compound may be prepared, as described in the aforesaid copending application, by reacting hexachlorocyclopentadiene with bicyclo-(2.2.1)-2,5-heptadiene, suitably by heating, to form their equimolar Diels-Alder adduct, reacting the latter in a solvent, such as carbon tetrachloride, with bromine in like solution to form the 6,7-dibromo derivative of said adduct, and then reacting said derivative with sodium sulfide, such as by refluxing it with Na₂S.9H₂O in ethanol, to convert it to the 6,7-episulfido derivative by removing the bromine atoms and introducing a sulfur atom.

The 6,7-episulfoxy compound of the present invention may be prepared by oxidizing the aforesaid 6,7-episulfido derivative, with an organic per acid such as peracetic or perbenzoic acid, as follows:

To a solution of 102 grams of the aforesaid episulfido compound in 570 ml. of benzene there was added 32 ml. of a 67% peracetic acid solution over a 40-minute period while stirring rapidly. A temperature of 40° C. was maintained by controlling the rate of addition of the per acid. After an additional period of stirring, the reaction mixture was cooled and the separated solids were collected on a filter and washed successively with water, dilute sodium bicarbonate solution, and water again. After drying, the product amounted to 60 grams. By concentrating the benzene portion of the filtrate to 30 ml., collecting the separated solids, and recrystallizing the latter from benzene, there was obtained an additional 30 grams of product. The product is a white solid, M. P. 202° C., with decomposition, which is sparingly soluble in benzene and hexane.

*Analysis.*—Calculated for C₁₂H₈Cl₆OS: C, 34.85; H, 1.93; Cl, 51.5. Found: C, 34.79; H, 1.92; Cl, 51.47, 51.72.

The following comparative table shows the toxicity of the presently claimed compound in comparison with the compound from which it was immediately derived, and in further comparison with the halogenated insecticide chlordane, the latter for this purpose being rated 100%. The figures shown were obtained using the Kearns modified small chamber method of test (Soap and Sanitary Chemicals, May 1948, page 133) and the figures represent the relationship between the weight of chlordane required to produce an LD₅₀ and the weight of compound required to produce this same mortality:

| Compound: | Relative toxicity, percent |
|---|---|
| Chlordane (standard) | 100 |
| Episulfide | 165 |
| Episulfoxide | 320 |

The compound of the present invention also exhibits potency against other insects, and may be used in all the ways customary in the art either alone or in combination with other insecticides, and with the aid of the usual insecticidal adjuvants or carriers, such as by dissolving the insecticide base oils normally employed, as was done to obtain the foregoing comparative test data, or in combination with finely divided carriers to produce wettable and nonwettable insecticide dusts, or in the presence of emulsifying agents in combination with water or with water and oil.

I claim:
1. The compound 1,2,3,4,10,10-hexachloro-6,7-episulfoxy - 1,4,4a,5,6,7,7,8,8a - octahydro - 1,4,5,8 - dimethanonaphthalene melting with decomposition at about 202° C., and having the following structural formula:

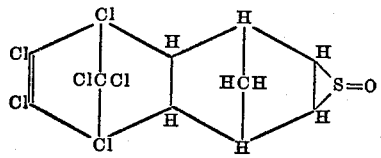

2. The process of forming the compound of claim 1 which comprises oxidizing the 6,7-episulfido derivative of the Diels-Alder adduct of hexachlorocyclopentadiene and bicyclo-(2.2.1)-2,5-heptadiene.

3. The method which comprises applying to insects and their habitats the compound of claim 1.

No references cited.